Oct. 13, 1936.  H. T. BOOTH  2,056,952
VISCOSIMETER
Filed Feb. 7, 1933
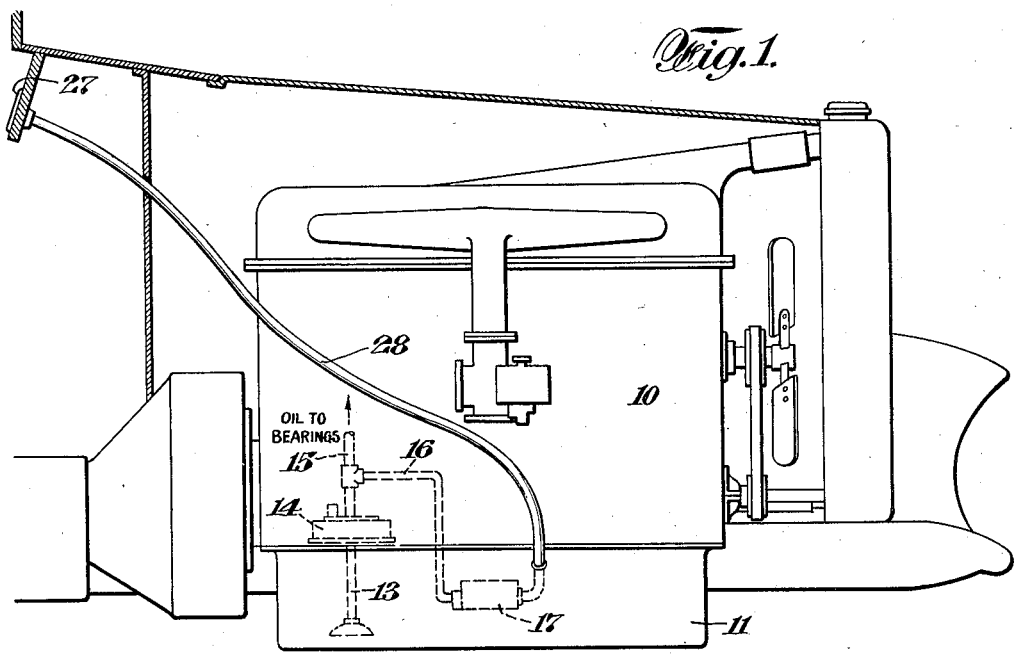
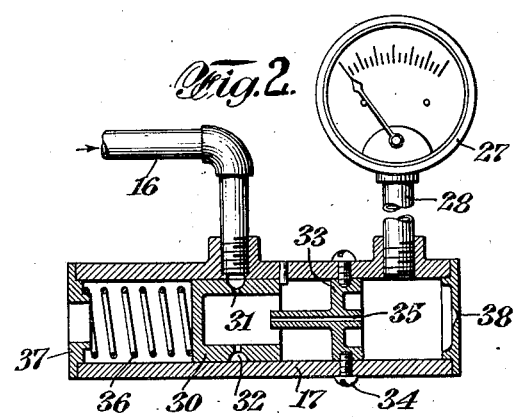
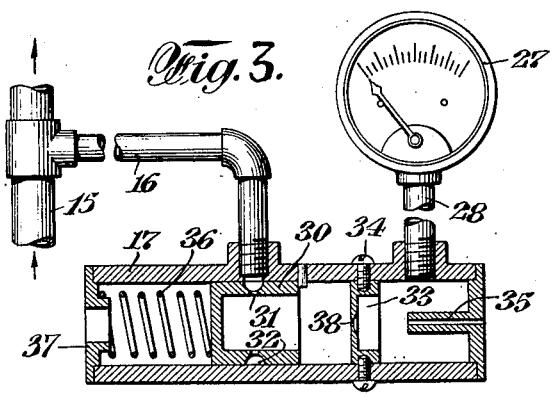
INVENTOR
Harry T. Booth
BY
Kenyon & Kenyon
ATTORNEYS Patented Oct. 13, 1936

2,056,952

UNITED STATES PATENT OFFICE 2,056,952

VISCOSIMETER

Harry T. Booth, Detroit, Mich., assignor to Lubrication Control Corporation, Chicago, Ill., a corporation of Delaware Application February 7, 1933, Serial No. 655,579

4 Claims. (Cl. 265—11)

This invention relates to a viscosimeter and has for an object a simple and efficient device for directly measuring the viscosity of fluid flowing through the device.

In a device embodying the invention, fluid is caused to pass successively through two ports, one comprising a friction tube, the resistance of which to fluid flow varies with the viscosity of the fluid and the other port comprising an orifice, the resistance of which to fluid flow is substantially independent of the viscosity of the fluid, these ports being arranged in either of two orders of succession.

Means are provided for supplying fluid to the first port at constant pressure and the pressure of the fluid between the two ports is applied to a pressure actuated viscosity indicator. The pressure of the fluid between the two ports is a function of the viscosity of the fluid and the indicator gives direct viscosity readings of the fluid flowing through the device.

Other objects, novel features and advantages of this invention will be apparent from the following specification and accompanying drawing, wherein:

Fig. 1 is a side elevation of an automobile engine having its lubricating system provided with a viscosimeter embodying the invention; and Figs. 2 and 3 are enlarged vertical central sectional views of viscosimeters embodying the invention.

The internal combustion engine 10 is provided with an oil pan 11 from the lower portion of which a pipe 13 leads to the intake port of a pump 14. A pipe 15 leads from the outlet port of the pump 14 to the engine bearings (not shown). A relief valve may be connected to the pipe 15 for preventing the oil pressure in said pipe from exceeding a predetermined maximum.

A pipe 16 leads from the pipe 15 to a casing 17 arranged in the upper part of the oil pan 11. The left end of the casing 17 is closed by a plug 18. A skirted piston 30 is slidably mounted in the casing and the skirt is provided with radial ports 31 which communicate with a peripheral groove 32 in the outer face of the skirt. The position of the piston 30 with respect to the pipe 16 controls the flow of oil through said pipe into the interior of the piston. A plug 33 is held in the casing 17 by screws 34 and carries a friction tube 35 which extends through the plug. A spring 36 is interposed between the piston 30 and the tubular plug 37 closing the left end of the casing 17. An orifice 38 is provided in the casing wall to the right of the plug 33 and a suitably calibrated pressure responsive indicator 27 is connected by a pipe 28 with the casing to be acted upon by fluid between the friction tube and orifice.

The friction tube 35 is of such dimensions that its resistance to fluid flow varies with the viscosity of the fluid while the orifice 38 is of such dimensions that its resistance to fluid flow is substantially independent of the fluid viscosity. The pressure of the oil supplied to the friction tube is maintained substantially constant as will subsequently be described and therefore change of viscosity of the oil effects conjoint variation of the resistance to flow of the friction tube and the pressure differential across the friction tube with resulting change of pressure between the friction tube and the orifice. As the resistance to flow of the orifice is dependent upon rate of flow and is substantially independent of viscosity, and as the rate of flow through the orifice is the same as through the friction tube, the pressure of oil between the friction tube and orifice is a measure of the rate of flow through the friction tube and is a function of the oil viscosity.

The pressure of the oil supplied to the friction tube 35 is maintained constant by regulatory action of the valve 30 against and under the influence of the spring 36. The pressure of the oil in the chamber between the plug 33 and the right hand end of the casing 17 is a function of its viscosity as previously pointed out and direct viscosity readings are obtainable from the indicator 27.

The modification disclosed in Fig. 3 differs from the modification disclosed in Fig. 2 in that the plug 33 contains the orifice 38 and the friction tube 35 is carried by the right hand end of the casing 17. In this modification, oil is supplied to the orifice at constant pressure and as its resistance to flow is dependent upon rate of flow and substantially independent of viscosity and as the rate of flow through the orifice and friction tube is the same, the pressure of the oil between the orifice and friction tube is a measure of the rate of flow through the friction tube and is a function of the oil viscosity. The indicator 27, therefore, gives direct viscosity readings.

In each of the modifications, oil is supplied to either a friction tube or an orifice at constant pressure and the oil pressure between the orifice and friction tube or between the friction tube and orifice is a function of the oil viscosity. The indicator 27 is responsive to variation in the fluid pressure between the friction tube and orifice or between the orifice and friction tube and is suitably calibrated to give direct viscosity readings. In the modification disclosed in Fig. 2, increase of pressure between the friction tube and orifice is indicative of viscosity decrease and vice versa, while in the modification disclosed in Fig. 3, increase of pressure between the orifice and friction tube is indicative of viscosity increase and vice versa.

It is of course understood that various modifications may be made in the structure above described, without in any way departing from the spirit of the invention as defined in the appended claims.

I claim:

1. A viscosimeter comprising a casing having an inlet port and a discharge port, a member mounted in said casing between said inlet and outlet ports and dividing the casing into a first chamber and a second chamber, said member being provided with a port intermediate said inlet and said outlet ports, a piston valve movable in said first chamber in response to the pressure of fluid delivered through said inlet port for controlling fluid flow therethrough and a pressure responsive viscosity indicator communicating with said second chamber, one of said intermediate and outlet ports being a friction tube and the other being an orifice.

2. In a viscosimeter, a cylindrical casing having a partition dividing it into two sections, a piston slidably mounted in one section, said casing having a port across which said piston is reciprocable to control flow into the casing, a spring tending to oppose movement of the piston away from said partition, said partition being provided with a port and said casing having an outlet port, and a pressure responsive viscosity indicator connected to said casing between said two last-named ports of which one is a friction tube and the other is an orifice.

3. In a viscosimeter, a cylindrical casing having a partition dividing it into two sections, a piston slidably mounted in one section, said casing having a port across which said piston is reciprocable to control flow into the casing, a spring tending to oppose movement of the piston away from said partition, said partition being provided with an orifice and said casing having a friction tube outlet, and a pressure responsive viscosity indicator connected to said casing between said orifice and friction tube.

4. In a viscosimeter, a cylindrical casing having a partition dividing it into two sections, a piston slidably mounted in one section, said casing having a port across which said piston is reciprocable to control flow into the casing, a spring tending to oppose movement of the piston away from said partition, said partition being provided with a friction tube and said casing having an outlet orifice, and a pressure responsive viscosity indicator connected to said casing between said friction tube and orifice.

HARRY T. BOOTH.